3,083,449
BEARING SERVICING TOOL
Jesse Thomas Simmons, 601 N. Main St., Chattanooga, Tenn.
Filed May 1, 1959, Ser. No. 810,346
3 Claims. (Cl. 29—255)

This invention relates to a tool for removing and replacing bearing sleeves or bushings in machine bearings, especially in bearings for automotive transmissions and other parts.

The tool is especially useful in replacing bearing bushings where the part which supports the bushing is counterbored at one end of the bushing, the cylindrical inner wall of the counterbore being concentric with the cylindrical inner wall of the bearing sleeve. The counterbore may form a recess or pocket for receiving an oil-sealing ring or other machine element.

The tool of my invention involves three main parts; first is a driving mandrel which is used both in removing a bushing and replacing a bushing in the bearing. Secondly, a pilot ring is provided which fits snugly within the counterbore at one end of the bearing and serves to guide the mandrel when a new bushing is being driven into the bearing opening. The third element is a stop ring removably carried by the mandrel and is used only when driving a new bearing or bushing into the bearing opening. For convenience in use, the tool may be provided with its own slide hammer for use in driving the mandrel, although a separate hammer or other driving means may be employed for this purpose if desired.

It is necessary in order to replace worn bushings or insert new seals in various automotive parts that the mandrel, pilot ring and stop ring fit the particular parts which are to be serviced. Consequently the dimensions vary and the tool is furnished in dimensions appropriate to the parts which are to be replaced.

Figure 1:
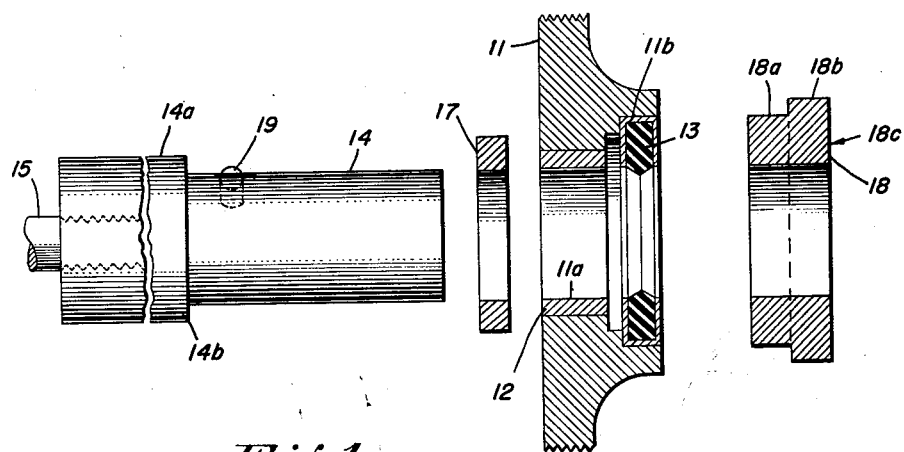
FIGURE 1 is a sectional view of a typical bearing assembly and showing various parts of my bearing servicing tool useful in removing and replacing the bearing sleeve or bushing. The driving mandrel of the tool is shown in side elevation, while the pilot ring and the stop ring are shown in section along the same cutting plane as the bearing assembly.

In FIGURE 1 of the drawing I have shown a typical bearing assembly mounted within a wall portion 11, which may be the wall of a gear casing or other machine part, having a bearing opening 11a formed therein and containing a bearing sleeve or bushing 12. The bearing support 11 is counterbored at one end of bearing opening 11a, as at 11b, to provide a recess for an oil-sealing ring 13 of conventional construction, the counterbore 11b being concentric with opening 11a.

The tool for servicing the bearing assembly shown in FIGURE 1 comprises a mandrel having a cylindrical pilot portion 14 of an outside diameter to provide a close sliding fit in the bore of the bearing bushing 12. At one end of the mandrel is an enlarged head portion 14a providing a radial shoulder 14b. The head portion 14a has a diameter slightly smaller than the diameter of bearing 11a in the automotive part 11. Head portion 14a is drilled axially and tapped to receive the shaft or stem 15 of a conventional slide-hammer having a sliding head or impact member 16, see FIGURE 2.

Stop ring 17 is bored for a sliding fit on the pilot portion 14 of the mandrel. The external diameter of ring 17 should be greater than that of sleeve 12 but otherwise is unimportant unless the automotive part 11 has a recess or counter-bore in the face adjacent the driving mandrel. In such a case, the external diameter of the ring must be a clearance fit in such a recess. A conventional ball detent 19 is mounted in a recess in pilot portion 14 and is urged outwardly by the usual spring and serves to lock stop ring 17 to the mandrel against shoulder 14b whenever the ring is to be used.

The pilot ring 18 has a bore to receive the pilot portion 14 of the mandrel in a close sliding fit, and one end portion 18a has an external diameter to fit into the counter-bore 11b with a close sliding fit, the other end portion 18b being of larger external diameter than the diameter of counter-bore 11b.

The tool is used as follows: to remove bushing 12 the pilot mandrel 14 of the tool, without its stop ring, is inserted into the bore of the bushing until shoulder 14b engages the left end of bushing 12. The slide-hammer is then operated to drive the bushing out of bore 11a, and this operation will also remove the oil-seal ring 13 if it has not already been removed.

Figure 2:
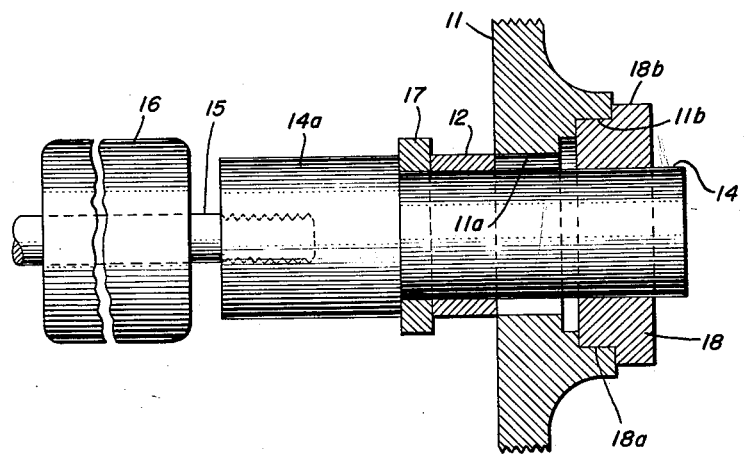
FIGURE 2 is a view similar to FIGURE 1 except that the tool parts are shown in position for inserting a new bearing sleeve into the bearing opening.

To insert a new bushing, the stop ring 17 is placed on the mandrel portion 14 in contact with shoulder 14b and it is locked on by the detent 19. Pilot ring 18 is now inserted into counter-bore 11b as shown in FIGURE 2. A new bushing 12 is now placed on pilot portion 14 which is then passed through bore 11a and inserted in the bore of the pilot ring 18 until the bushing is ready to enter bore 11a, see FIGURE 2. Tapping with the slide-hammer drives the bushing home. The new bushing takes its exact position flush with the face of part 11 because the stop ring 17, by engaging the face of part 11, stops all further inward movement of the bushing.

For replacing the oil-sealing ring 13, the mandrel 14 is removed and stop-ring 17 is replaced by pilot-ring 18 with the larger flat radial face 18c facing away from the mandrel head 14a. The oil-sealing ring 13 is then placed upon the mandrel 14 in contact with the ring face 18c and the mandrel is then introduced into the bore of the sleeve 12 from the right side as shown in FIGURE 1 until the ring 13 is in a position to enter the counter-bore 11b. The mandrel 14, having a close-sliding fit with the bore of bushing 12, insures centering of the ring 13 with respect to the counter-bore 11b, so that operation of the slide-hammer drives the ring 13 into the counter-bore. Inward movement of the ring 13 may be limited either by an internal shoulder within the counterbore, or by the ring surface 18c coming in contact with the flat face of the support 11 surrounding the counter-bore 11b. Since the ring 13 is engaged over the entire area by the flat face 18c of ring 18, the ring is piloted into proper position without creasing or cocking which often cause annoying and expensive oil leaks.

This tool removes old bushings quickly, prevents the driving of a bushing beyond its intended position, prevents cocking of a bushing or jambing or pinching of an oil-seal. It permits much more accurate and expeditious repairs than have heretofore been commonly possible.

I claim:

1. A tool for servicing a bearing assembly in which a bearing bushing is supported in a bore formed in a supporting member and said member having a counter-bore at one end of said bore, said tool comprising a mandrel having a pilot portion and an enlarged head portion providing a shoulder between said portions, said pilot portion having a diameter providing a close sliding fit in the bore of said bushing, said head portion having a diameter larger than the bore of said bushing and smaller than the bore in said supporting member to provide a sliding fit in the bushing receiving bore of said member, a stop-ring having a bore providing a close sliding fit of the ring on said pilot portion and an external diameter larger than the bushing receiving bore in said supporting member, and a pilot-ring having a bore providing a close-sliding fit of the ring on the pilot portion of said mandrel and having a cylindrical portion with an outside diameter to fit closely within said counter-bore.

2. A tool according to claim 1 wherein said pilot ring is provided with a cylindrical portion adjacent the other end thereof of a diameter larger than the diameter of said counter-bore and providing a flat annular surface at said other end of said pilot-ring.

3. A tool for servicing a bearing assembly having a bearing bushing fitted within a bore in a supporting member, said tool comprising a mandrel having a pilot portion and an enlarged head portion providing a shoulder between said portions, said pilot portion having a diameter providing a close sliding fit in the bore of said bushing, said head portion having a diameter larger than the bore of said bushing and smaller than the bore in said supporting member to provide a sliding fit in the bushing receiving bore of said member, a stop-ring having a bore providing a close sliding fit of the ring on said pilot portion and an external diameter larger than the bushing receiving bore in said supporting member, and a spring-pressed detent carried by the pilot portion of the mandrel in a position to frictionally hold said stop-ring upon said pilot portion in contact with said shoulder.

References Cited in the file of this patent

UNITED STATES PATENTS

| | | |
|---|---|---|
| 1,448,597 | Pitzer | Mar. 13, 1923 |
| 1,736,529 | Goeller | Nov. 19, 1929 |
| 1,797,766 | Frye | Mar. 24, 1931 |
| 1,810,884 | Minor | June 16, 1931 |
| 1,987,677 | Glassford | Jan. 15, 1935 |
| 2,279,649 | White et al. | Apr. 14, 1942 |
| 2,317,405 | Rutter | Apr. 27, 1943 |
| 2,680,903 | Potter | June 15, 1954 |
| 2,682,103 | Hamilton | June 29, 1954 |
| 2,761,347 | McKee | Sept. 4, 1956 |
| 2,859,456 | Taylor | Nov. 11, 1958 |
| 2,860,535 | Fowler | Nov. 18, 1958 |
| 2,887,768 | Sunnen | May 26, 1959 |